US008886387B1

(12) United States Patent
Agarwal et al.

(10) Patent No.: US 8,886,387 B1
(45) Date of Patent: Nov. 11, 2014

(54) ESTIMATING MULTI-VEHICLE MOTION CHARACTERISTICS BY FINDING STABLE REFERENCE POINTS

(71) Applicant: Google Inc., Mountain View, CA (US)

(72) Inventors: Pratik Agarwal, Kolkata (IN); Jiajun Zhu, Sunnyvale, CA (US)

(*) Notice: Subject to any disclaimer, the term of this patent is extended or adjusted under 35 U.S.C. 154(b) by 0 days.

(21) Appl. No.: 14/148,874

(22) Filed: Jan. 7, 2014

(51) Int. Cl.
G01C 22/00 (2006.01)
G05D 1/00 (2006.01)
(52) U.S. Cl.
CPC .................... G05D 1/0088 (2013.01)
USPC ........................................... 701/28
(58) Field of Classification Search
None
See application file for complete search history.

(56) References Cited

U.S. PATENT DOCUMENTS 8,260,539 B2    9/2012  Zeng
8,473,144 B1    6/2013  Dolgov et al.
2009/0245573 A1*  10/2009  Saptharishi et al. .......... 382/103
2013/0202197 A1    8/2013  Reeler et al.
2013/0278631 A1*  10/2013  Border et al. .................. 345/633
2014/0198184 A1*  7/2014   Stein et al. ...................... 348/47

FOREIGN PATENT DOCUMENTS

WO    2013150286    10/2013

* cited by examiner

Primary Examiner — Thomas Tarcza
Assistant Examiner — Adam Alharbi
(74) Attorney, Agent, or Firm — McDonnell Boehnen Hulbert & Berghoff LLP

(57) ABSTRACT

A computing device may identify an object in an environment of a vehicle and receive a first three-dimensional (3D) point cloud depicting a first view of the object. The computing device may determine a reference point on the object in the first 3D point cloud, and receive a second 3D point cloud depicting a second view of the object. The computing device may determine a transformation between the first view and the second view, and estimate a projection of the reference point from the first view relative to the second view based on the transformation so as to trace the reference point from the first view to the second view. The computing device may determine one or more motion characteristics of the object based on the projection of the reference point.

20 Claims, 6 Drawing Sheets

ESTIMATING MULTI-VEHICLE MOTION CHARACTERISTICS BY FINDING STABLE REFERENCE POINTS

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure describes embodiments that relate to estimating multi-vehicle motion characteristics by finding stable reference points. In one aspect, the present disclosure describes a method. The method comprises identifying, by a computing device, an object in an environment of a vehicle, where the computing device is configured to have access to one or more motion characteristics of the vehicle. The method also comprises receiving a first three-dimensional (3D) point cloud depicting a first view of the object. The method further comprises determining a reference point on the object in the first 3D point cloud. The method also comprises receiving a second 3D point cloud depicting a second view of the object, where the second view includes at least a portion of the first view, and where the second 3D point cloud is captured a given period of time after the first 3D point cloud is captured. The method further comprises determining a transformation between the first view and the second view based on matching the portion of the object depicted in the first view to a corresponding portion depicted in the second view; and estimating a projection of the reference point from the first view relative to the second view based on the transformation so as to trace the reference point from the first view to the second view. The method also comprises determining one or more motion characteristics of the object based on the projection of the reference point, the given time period, and the one or more motion characteristics of the vehicle.

In another aspect, the present disclosure describes a non-transitory computer readable medium having stored thereon instructions that, when executed by a computing device, cause the computing device to perform functions. The functions comprise identifying an object in an environment of a vehicle, where the computing device is configured to have access to one or more motion characteristics of the vehicle. The functions also comprise receiving a first three-dimensional (3D) point cloud depicting a first view of the object. The functions further comprise determining a reference point on the object in the first 3D point cloud. The functions also comprise receiving a second 3D point cloud depicting a second view of the object, where the second view includes at least a portion of the first view, and where the second 3D point cloud is captured a given period of time after the first 3D point cloud is captured. The functions further comprise determining a transformation between the first view and the second view based on matching the portion of the object depicted in the first view to a corresponding portion depicted in the second view; and estimating a projection of the reference point from the first view relative to the second view based on the transformation so as to trace the reference point from the first view to the second view. The functions also comprise determining one or more motion characteristics of the object based on the projection of the reference point, the given time period, and the one or more motion characteristics of the vehicle.

In still another aspect, the present disclosure describes a system. The system comprises at least one processor; and data storage comprising instructions that, when executed by the at least one processor, cause the system to perform functions. The functions comprise identifying an object in an environment of a vehicle, where the at least one processor is configured to have access to one or more motion characteristics of the vehicle. The functions also comprise receiving a first three-dimensional (3D) point cloud depicting a first view of the object. The functions further comprise determining a reference point on the object in the first 3D point cloud. The functions also comprise receiving a second 3D point cloud depicting a second view of the object, where the second view includes at least a portion of the first view, and where the second 3D point cloud is captured a given period of time after the first 3D point cloud is captured. The functions further comprise determining a transformation between the first view and the second view based on matching the portion of the object depicted in the first view to a corresponding portion depicted in the second view; and estimating a projection of the reference point from the first view relative to the second view based on the transformation so as to trace the reference point from the first view to the second view. The functions also comprise determining one or more motion characteristics of the object based on the projection of the reference point, the given time period, and the one or more motion characteristics of the vehicle.

In still another aspect, the present disclosure describes a device. The device comprises a means for identifying an object in an environment of a vehicle, where the device is configured to have access to one or more motion characteristics of the vehicle. The device also comprises a means for receiving a first three-dimensional (3D) point cloud depicting a first view of the object. The device further comprises a means for determining a reference point on the object in the first 3D point cloud. The device also comprises a means for receiving a second 3D point cloud depicting a second view of the object, where the second view includes at least a portion of the first view, and where the second 3D point cloud is captured a given period of time after the first 3D point cloud is captured. The device further comprises a means for determining a transformation between the first view and the second view based on matching the portion of the object depicted in the first view to a corresponding portion depicted in the second view; and a means for estimating a projection of the reference point from the first view relative to the second view based on the transformation so as to trace the reference point from the first view to the second view. The device also comprises a means for determining one or more motion characteristics of the object based on the projection of the reference point, the given time period, and the one or more motion characteristics of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
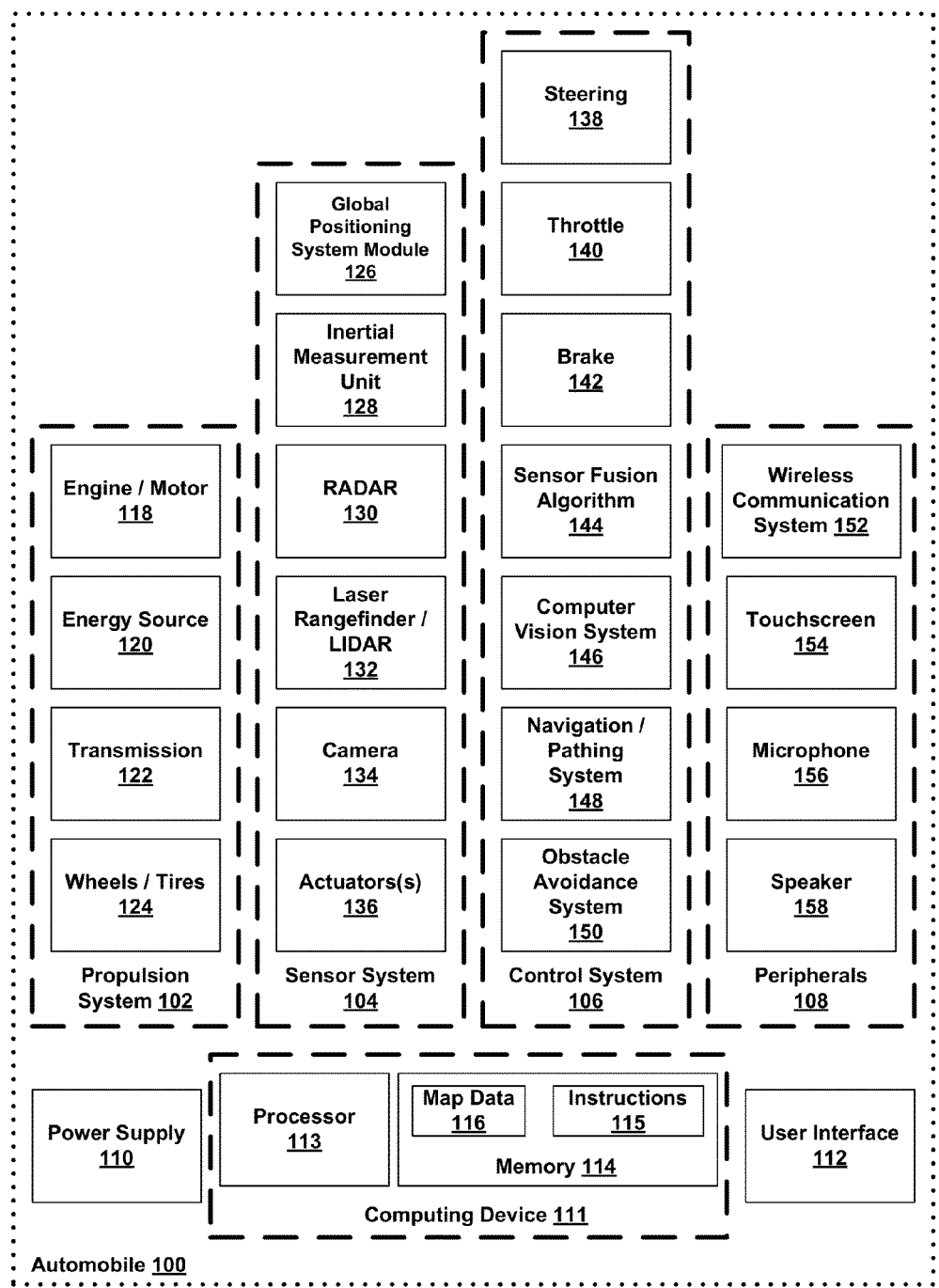
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road relies on detecting and identifying objects (e.g., cars, trucks, motorcycles, etc.) on or proximate to the road for navigation. Identifying objects and determining motion characteristic of the identified objects (e.g., whether an object is static or dynamic, speed, acceleration, etc.) provide situational awareness to the autonomous vehicle and facilitates safe navigation. Accurately identifying objects over time with a depth sensor coupled to a vehicle while the vehicle is moving can be challenging. For example, a portion of the object may not be within the field of view of the sensor. In another example, an object may be partially occluded (e.g., by other objects on the road) within the field of view of the sensor. Partial occlusion of the object may impede accurate estimation of speed and heading of the object. Disclosed herein are methods and systems for determining stable reference points for objects that can be used to accurately estimate heading and velocity of the object.

In an example, a light detection and ranging (LIDAR) device may be coupled to a first vehicle and may be configured to collect data points by emitting light (e.g., laser) and receiving reflections of the light from objects on or proximate to the road to identify the objects. The data points comprise 3D point clouds depicting objects. For instance, a first vehicle may be configured to identify a second vehicle ahead of the first vehicle. Initially, in a first 3D point cloud, a rear portion of the second vehicle may be depicted. As the first vehicle approaches the second vehicle, a second 3D point cloud captured after the first 3D point cloud may depict the rear as well as one side of the second vehicle. The second 3D point cloud may be captured a given period of time after the first 3D point cloud is captured. As the first vehicle approaches the second vehicle further from the one side, a third 3D point cloud may depict the one side of the car while other parts of the second vehicle may not be depicted in the third 3D point cloud. The third 3D point cloud may be captured a given period of time after the second 3D point cloud is captured.

In an example, a computing device of the first vehicle may be configured to assign any point on the object as depicted in the first 3D point cloud as a reference point. When the second 3D point cloud is captured, the computing device may be configured to determine a transformation between a view of the second vehicle in the first 3D point cloud (i.e., rear of the second vehicle) and a view of the second vehicle in the second 3D point cloud (i.e., rear and side of the second vehicle). The transformation may be based on a common portion of the second vehicle depicted in both the first 3D point cloud and the second 3D point cloud. Based on the transformation, the computing device may be configured to estimate a projection of the reference point in the view shown in the second 3D point cloud. Even if the reference point is occluded in the view shown in the second 3D point cloud, the computing device may be configured to accurately estimate a location of the reference point based on the transformation. Similarly, the computing device may be configured to perform scan matching between the view of the second vehicle in the second 3D point cloud and a view of the second vehicle in the third 3D point cloud and project the reference point in the view shown in the third 3D point cloud. In this manner, the computing device may be configured to perform scan matching to determine a transformation based on correspondence between three different views i) rear; ii) rear and side; and iii) side of the second vehicle, and trace a reference point in the three different views based on the transformation. A respective reference point may be determined and traced for each object on or proximate to the road.

In examples, the computing device may be configured to have access to speed and direction of motion of the first vehicle. Based on i) speed and direction of motion of the first vehicle; ii) the given period of time separating capture of consecutive 3D point clouds, and iii) tracing the reference point between the different views, the computing device may be configured to estimate the heading and velocity of the second vehicle.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an O2 monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 502.11 (including any IEEE 502.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
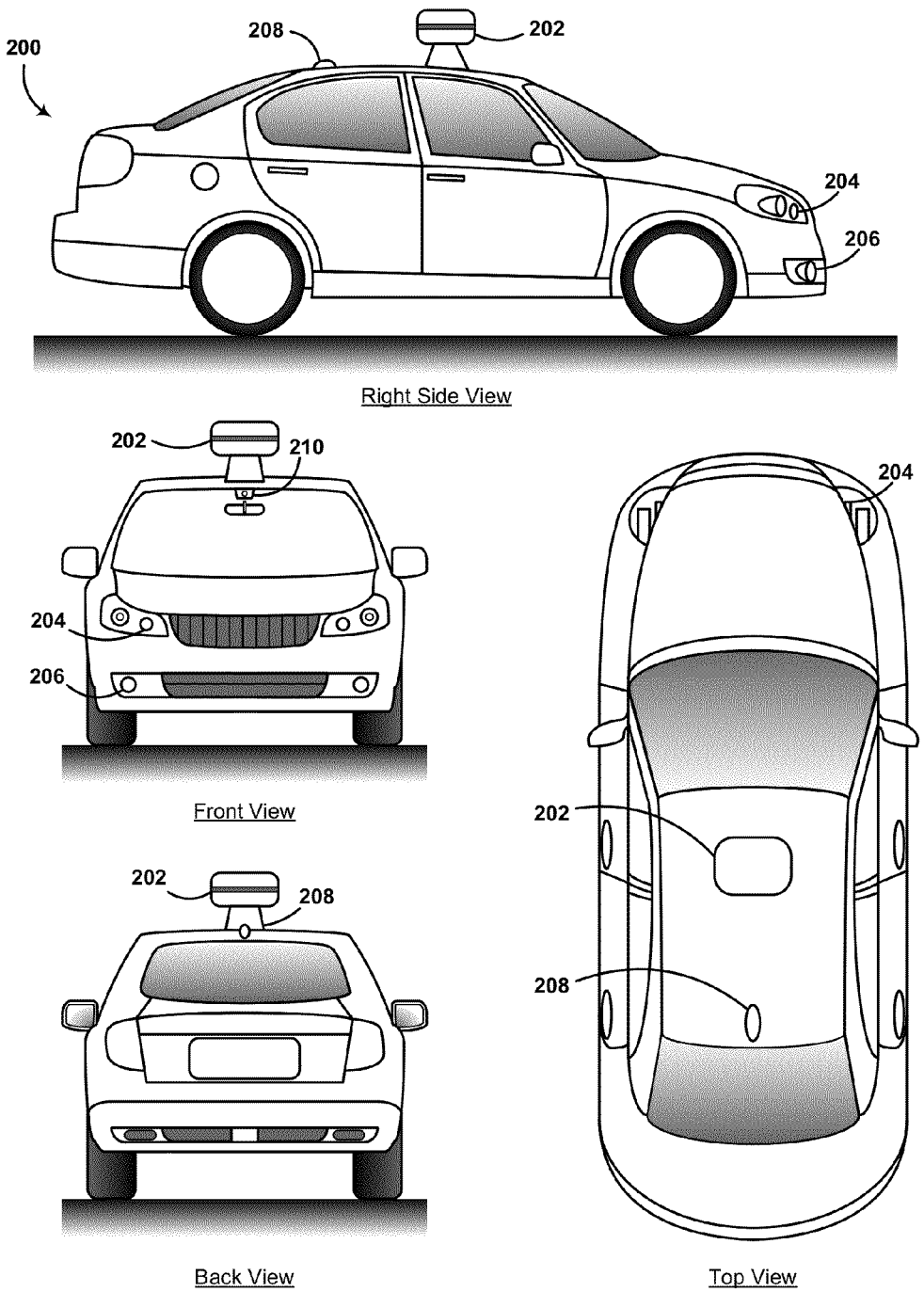
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to perceive an environment of the vehicle and detect obstacles, ground, and free space and control the automobile 200 in accordance with a control strategy from among multiple possible control strategies.

Figure 3:
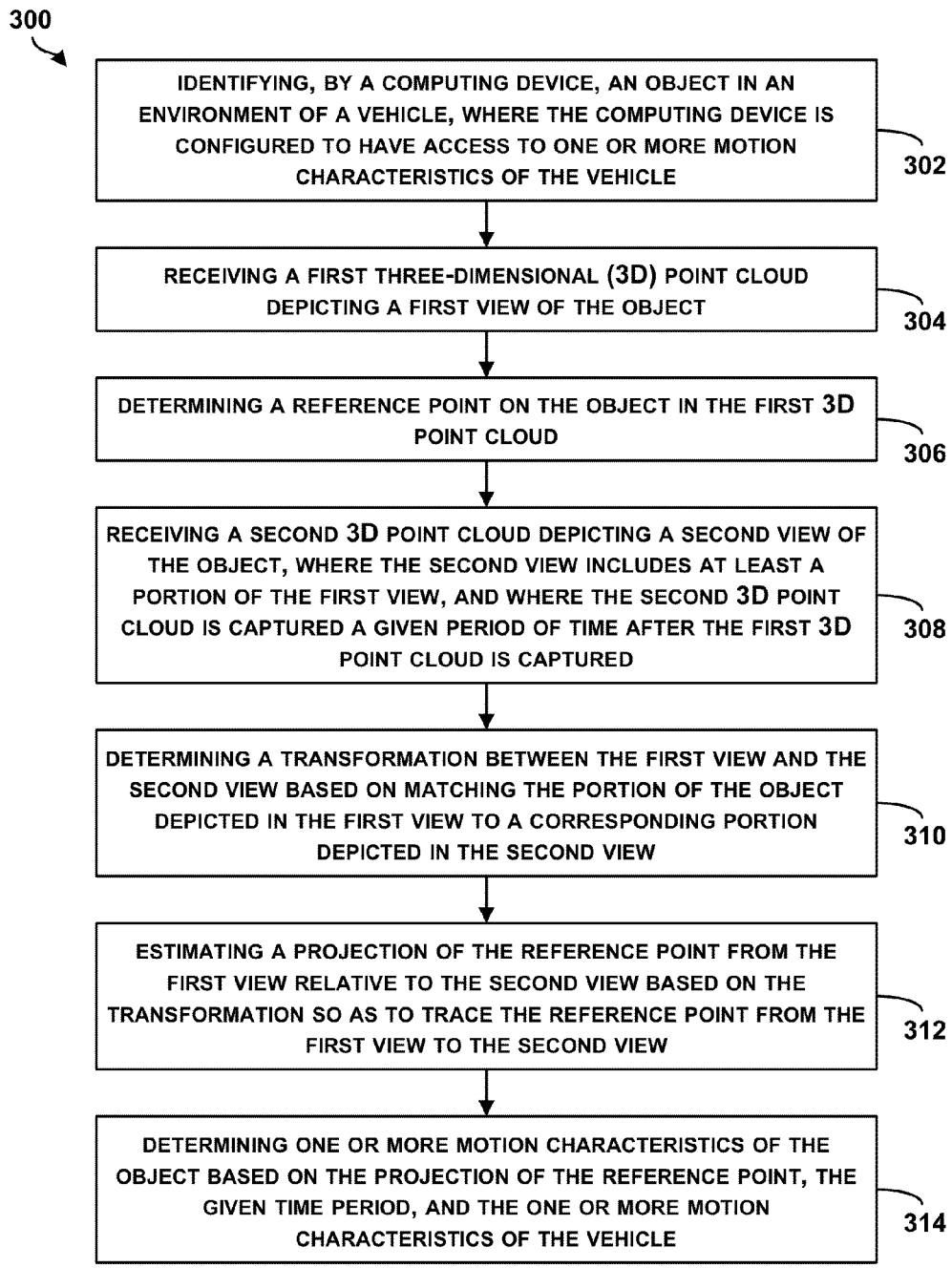
FIG. 3 is a flow chart of a method for estimating multi-vehicle motion characteristics by finding stable reference points, in accordance with an example embodiment.

FIG. 3 is a flow chart of a method 300 for estimating multi-vehicle motion characteristics by finding a stable reference point, in accordance with an example embodiment. The method 300 may include one or more operations, functions, or actions as illustrated by one or more of blocks 302-314. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes identifying, by a computing device, an object in an environment of a vehicle, where the computing device is configured to have access to one or more motion characteristics of the vehicle. The computing device, such as the computing device 111 described in FIG. 1, may be onboard a vehicle or may be off-board but in wireless communication with the vehicle, for example. The computing device may be configured to control the vehicle in an autonomous or semi-autonomous operation mode. Further, the computing device may be configured to receive, from sensors and devices coupled to the vehicle, information associated with, for example, condition of systems and subsystems of the vehicle, driving conditions, road conditions, etc.

The computing device may be configured to identify a set of nearby obstacles or objects on the road or proximate to (e.g., in a vicinity of) the road of travel of the vehicle. For example, the computing device may be configured to identify vehicles in adjacent lanes both behind and ahead of the vehicle, static objects next to or ahead of the vehicle (e.g., guard rails on freeways, curbs, trees, parked cars, traffic signs, etc.,), motorcycles and cyclists ahead and behind, nearby pedestrians, both on the road and off the road, and any other object that may affect navigation determinations by the computing device.

To identify the object and characteristics of the objects, the computing device may be configured to use the sensors and devices coupled to the vehicle. For example, a camera, such as the camera 134 in FIG. 1 or the camera 210 in FIG. 2 or any other image-capture device, may be coupled to the vehicle and may be in communication with the computing device. The camera may be configured to capture images or a video of the road and vicinity of the road. The computing device may be configured to receive the images or video and identify, using image processing techniques for example, objects depicted in the image or the video. The computing device may be configured compare portions of the images to templates of objects to identify the objects, for example.

In another example, the computing device may be configured to receive, from a LIDAR device (e.g., the LIDAR unit 132 in FIG. 1) coupled to the vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the vehicle. Additionally, the LIDAR device may be configured to provide to the computing device intensity values of the light or laser reflected off the obstacles that may be indicative of a surface type of a given object. Based on such information, the computing device may be configured to identify the objects and characteristics of the objects such as type of the object, size, geometric characteristics (e.g., width, length, and height), etc.

In still another example, the computing device may be configured to receive, from a RADAR device (e.g., the RADAR unit 130 in FIG. 1) coupled to the vehicle and in communication with the computing device, RADAR-based information relating to location and characteristics of the objects. The RADAR device may be configured to emit radio waves and receive back the emitted radio waves that bounced off the surface of objects on the road and in the vicinity of the road. The received signals or RADAR-based information may be indicative, for example, of dimensional characteristics of a given object.

Further, the computing device may be configured to have access to motion characteristics of the vehicle that the computing device is configured to control. For example, the computing device may be configured to receive, e.g., from sensors coupled to the vehicle, information indicative of characteristics of the vehicle such as speed, acceleration (or deceleration), pose of the vehicle (i.e., orientation, steering angle, and/or direction of travel), etc. For instance, an Inertial Measurement Unit (IMU), such as the IMU 128 described with respect to FIG. 1, may be coupled to the vehicle and may be configured to provide to the computing device orientation information associated with position and orientation changes (e.g., yaw angle) of the vehicle based on inertial acceleration. Similarly, other sensors may provide motion characteristics information to the computing device, such as speed of the vehicle, for example.

At block 304, the method 300 includes receiving a first three-dimensional (3D) point cloud depicting a first view of the object. As described above, if the scan data are acquired by a LIDAR device, the plurality of points in the environment of the vehicle may be represented by the LIDAR device in terms of azimuth and elevation angles, in addition to range, which can be converted to (X, Y, Z) point data relative to a local coordinate frame attached to the vehicle as described above. The first 3D point cloud may depict objects in the environment of the vehicle controlled by the computing device. The computing device may be configured to identify such objects as described above.

Figure 4A:
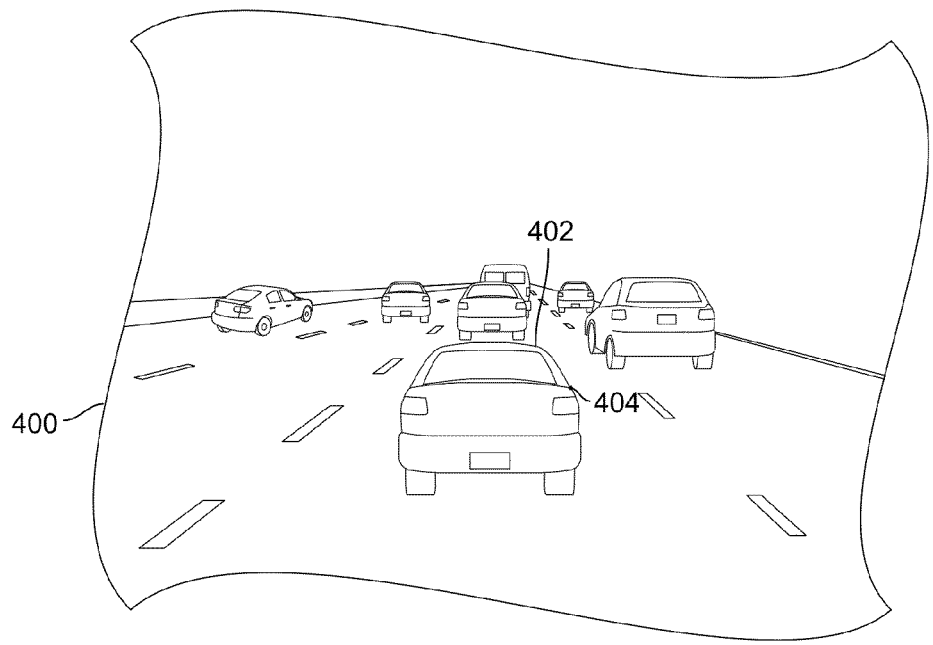
FIG. 4A illustrates an image associated with a 3D point cloud depicting rear of an identified vehicle, in accordance with an example embodiment.
Figure 4B:
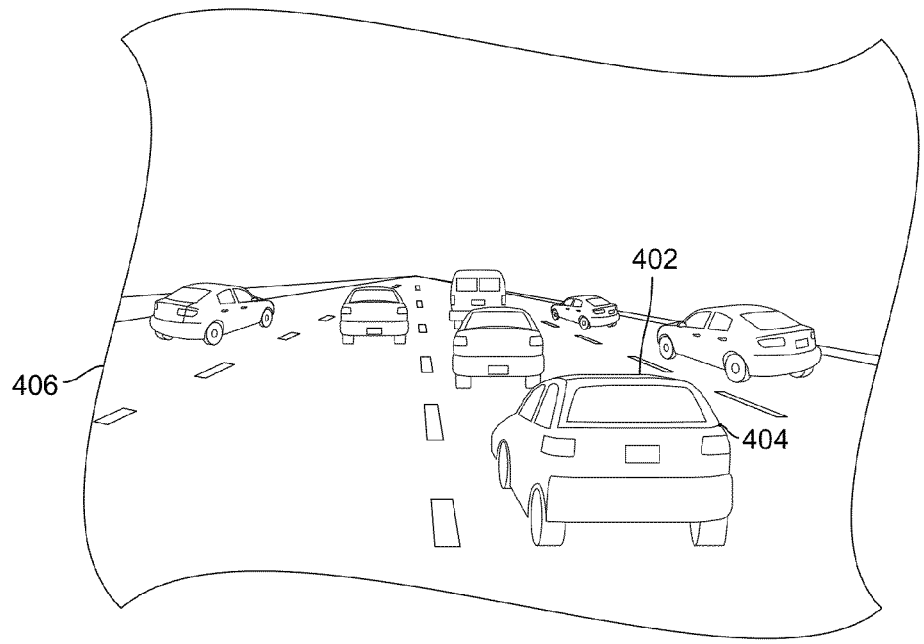
FIG. 4B illustrates an image associated with a 3D point cloud depicting the rear and a side of the identified vehicle, in accordance with an example embodiment.
Figure 4C:
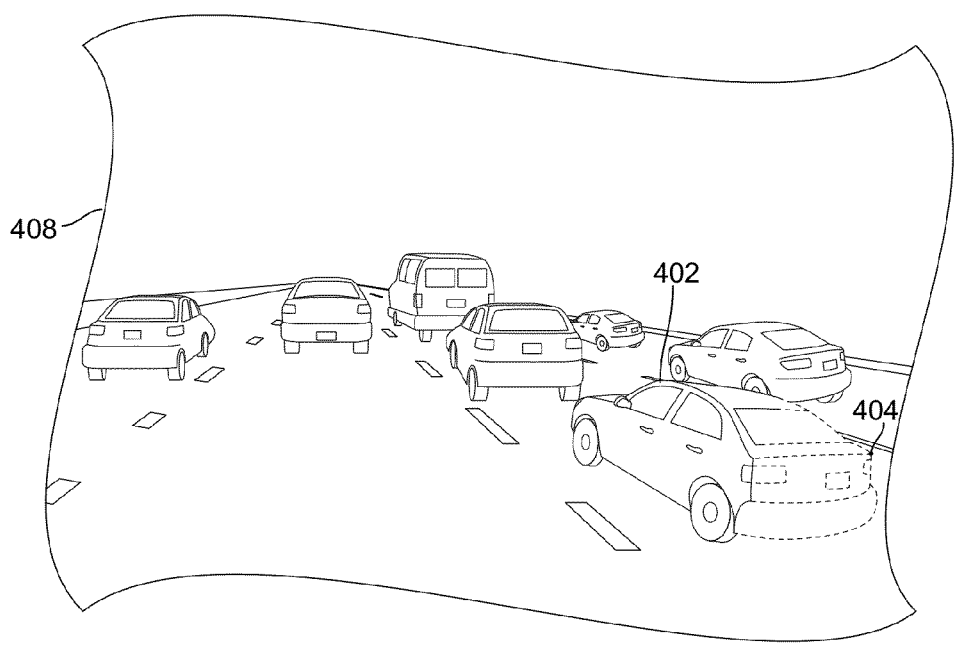
FIG. 4C illustrates an image associated with a 3D point cloud depicting the side of the identified vehicle, in accordance with an example embodiment.

FIG. 4A illustrates an image 400 associated with a 3D point cloud depicting rear of an identified vehicle 402, in accordance with an example embodiment. It is noted that the images shown in FIGS. 4A, 4B, and 4C are images that conceptually represent an environment of a vehicle for which point clouds may be received. The images are provided for illustrative purposes only.

The image 400 may represent a 3D point cloud that has been captured by a LIDAR device, for example. The image 400 depicts several objects in the environment of the vehicle, such as other vehicles, road signs, road marks, etc. As an example, the first 3D point cloud may depict the vehicle 402 in front of the vehicle (not shown) controlled by the computing device. The vehicle 402 may be any type of vehicles (e.g., cars, trucks, motorcycles, etc.).

Determining motion characteristics of the identified objects using images or 3D point clouds can include processing occluded objects. For example, an object may be partially occluded (e.g., by other objects on the road) within the field of view of the image-capture device or LIDAR device. For instance, partial occlusion of the object may impede accurate estimation of speed and heading of the object. The method 300 describes determining motion characteristics of the identified objects such as the vehicle 402 based on tracing reference points associated with the identified objects.

Referring back to FIG. 3, at block 306, the method 300 includes determining a reference point on the object in the first 3D point cloud. In an example, the computing device of the vehicle may be configured to assign any point on the identified object depicted in the first 3D point cloud as a reference point. For example, referring to FIG. 4A, the computing device may determine or assign a point 404 (corner point on a rear of the vehicle 402) as a reference point. This point is shown here as an example for illustration only. Any other point on the vehicle 402 can be chosen as a reference point. Because the reference point 404 is a point on the vehicle 402, the reference point 404 may remain fixed relative to the vehicle 402 as both the vehicle 402 and the vehicle controlled by the computing device move.

Referring back to FIG. 3, at block 308, the method 300 includes receiving a second 3D point cloud depicting a second view of the object, where the second view includes at least a portion of the first view, and where the second 3D point cloud is captured a given period of time after the first 3D point cloud is captured. The computing device may be configured to receive consecutive 3D point clouds captured by the LIDAR device coupled to the vehicle at a given frequency (e.g., 10 Hz) as the vehicle moves on the road.

FIG. 4B illustrates an image 406 associated with a 3D point cloud depicting the rear and a side of the identified vehicle 402, in accordance with an example embodiment. As an example, the vehicle controlled by the computing device may approach the vehicle 402 from the left. A second 3D point cloud may be captured after the first 3D point cloud, and may depict the rear as well as left side of the vehicle 402 as shown in FIG. 4B. The second 3D point cloud may be captured a given period of time after the first 3D point cloud is captured.

FIG. 4C illustrates an image 408 associated with a 3D point cloud depicting the side of the identified vehicle 402, in accordance with an example embodiment. As the vehicle controlled by the computing device approaches the vehicle 402 further from the left and possibly starts to pass the vehicle 402, a third 3D point cloud shown in the image 408 may depict the left side of the vehicle 402. The third 3D point cloud may be captured a given period of time after the second 3D point cloud is captured. In an example, the rear of the vehicle 402 may be occluded by another vehicle (not shown), and thus, the left side of the vehicle 402 is depicted in the third 3D point cloud while the rear or a portion of the rear is not depicted. The occluded portion of the rear of the vehicle 402 is illustrated with dashed lines in the image 408.

Thus, the view of the vehicle 402 as depicted in second 3D point cloud of FIG. 4B includes at least a portion of the rear depicted in the first 3D point cloud of FIG. 4A. Similarly, the view of the vehicle 402 as depicted in third 3D point cloud of FIG. 4C includes at least a portion of the left side of the vehicle 402 as depicted in the second 3D point cloud of FIG. 4B.

At block 310, the method 300 includes determining a transformation between the first view and the second view based on matching the portion of the object depicted in the first view to a corresponding portion depicted in the second view. Referring to FIGS. 4A-4B, the computing device may be configured to match portions of the vehicle 402 that are common between the first 3D point cloud of FIG. 4A and the second 3D point cloud of FIG. 4B. Similarly, referring to FIGS. 4B-4C, the computing device may be configured to match portions of the vehicle 402 that are common between the second 3D point cloud of FIG. 4B and the third 3D point cloud of FIG. 4C, and so on. As an example, the computing device may be configured to implement an Iterative Closest Point (ICP) algorithm to perform the matching.

ICP is an algorithm that can be implemented by the computing device to minimize the difference between two 3D clouds of points. ICP can be used to reconstruct two-dimensional or three-dimensional surfaces from different scans (e.g., scans by the LIDAR device that result in respective 3D point clouds), to localize vehicles and achieve optimal path planning for the vehicles. The ICP algorithm can be used in real-time. ICP iteratively revises a transformation (e.g., translation, rotation) to minimize the distance between the points of two raw scans or two 3D point clouds. Input to the ICP algorithm may include points from two 3D point clouds, an initial estimation of the transformation, and criteria for stopping the iteration. Output of the ICP algorithm may include a refined transformation.

The algorithm steps may include associating points by the nearest neighbor criteria (i.e., for each point in one point cloud, finding the closest point in the second point cloud); estimating transformation parameters (rotation and translation) using a mean square cost function such that the transformation aligns each point to its match found in a previous step; transforming the points using the estimated parameters; and iterating to re-associate the points. A modified ICP algorithm may include a statistical method based on the distance distribution used to deal with outliers, occlusion, appearance, and disappearance, which enables subset-subset matching. The ICP algorithm is an example for illustration only. Other algorithms or techniques can be used and implemented by the computing device (e.g., a fast Fourier based transformation can be used) to estimate the transformation.

In an example, the transformation may include a rigid transformation (isometry) of a vector space that preserves distances between a pair of points in a 3D point cloud, when applied to the pair of points to obtain a corresponding pair of points in another 3D point cloud. In examples, the rigid transformation may include rotation and translation. For instance, the rigid transformation can be decomposed as a rotation (pitch and/or roll) followed by a translation (elevation). Objects/obstacles depicted in the first 3D point cloud may keep the same shape and size if the rigid transformation is applied to the first 3D point cloud to obtain the second 3D point cloud).

In an example, a transform, when acting on any vector v in a 3D point cloud 3D point cloud, may produce a transformed vector T(v) of the form:

$$T(v)=Rv+t \quad \text{Equation (1)}$$

where $R^T=R^{-1}$ (i.e., R is an orthogonal transformation), and t is a vector associated with a translation of an origin of a coordinate system of the 3D point cloud. For instance, elements of the matrix R may be a function of the pitch angle difference, the roll angle difference, and/or the elevation difference between a given point or feature (e.g., a planar feature) in the first 3D point cloud compared to the second 3D point cloud (or the second 3D point cloud compared to the third 3D point cloud). These examples are for illustration only, and other forms of transformation can be used as well.

In examples, for a robust estimation of the transformation, several previously captured 3D point clouds can be fused into a single 3D point cloud that is compared to a currently captured 3D point cloud to determine the transformation. In other example, for enhanced computational efficiency regarding determining the transformation in real-time, the computing device may down-sample consecutively captured 3D point clouds. For instance, assuming the LIDAR device captures 3D point clouds at a 10 HZ frequency, i.e., a 3D point cloud is captured every 0.1 seconds, the computing device may reduce the sampling/capturing rate of the LIDAR device. For example, in a span of 0.5 seconds, five 3D point clouds are captured by the LIDAR device. The computing device may, instead of determining the transformation for every pair of consecutively captured 3D point clouds, consider the first and third 3D point clouds and skip the second 3D point cloud. Similarly, the computing device may skip the fourth 3D point cloud and consider the third and fifth 3D point clouds to determine the transformation, and so on.

Referring back to FIG. 3, at block 312, the method 300 includes estimating a projection of the reference point from the first view relative to the second view based on the transformation so as to trace the reference point from the first view to the second view. Referring to FIGS. 4A and 4B, as described at block 310, the computing device may have determined the transformation between the view of the vehicle 402 as depicted in FIG. 4A and the view of the vehicle 402 as depicted in FIG. 4B based on matching the portion the vehicle 402 that is common between the two views (e.g., a portion of the rear of the vehicle 402 that is common to the 3D point cloud of FIG. 4A and the 3D point cloud of FIG. 4B). Upon determining the transformation, the computing device may be configured to project the reference point 404 from the view in FIG. 4A to the view in FIG. 4B. For instance, the reference point 404 may be defined or identified in the view of FIG. 4A as a vector including coordinates of the reference point 404 relative to a given coordinate system (e.g., a local coordinate system attached to the vehicle controlled by the computing device). If the transformation is determined in the form of a matrix, the computing device may apply the matrix (e.g., multiply the matrix) by the vector representing the reference point 404 so as to obtain a projection of the reference point 404 in the view of FIG. 4B.

In FIG. 4B, the reference point 404 is not occluded and is within the field of view of the LIDAR device coupled to the vehicle controlled by the computing device. The reference point 404 is thus "visible" or "perceivable" by the computing device and can be identified directly by the computing device. In an example, the computing device may perform the projection, and confirm the projection of the reference point 404 in the view of FIG. 4B by direct identification. In another example, the computing device may not confirm the projection and may rely solely on the transformation-based projection in identifying the reference point in the view of FIG. 4B.

In examples, the reference point 404 may not be within the field of view of the LIDAR device due to relative motion between the vehicle to which the LIDAR device is coupled and the vehicle 402. In other examples, the reference point 404 may be occluded by other objects intervening or blocking a portion of the field of view of the LIDAR device. FIG. 4C illustrates that at least a portion of the rear of the vehicle 402 is "unseen," or "unperceived" by the LIDAR device coupled to the vehicle controlled by the computing device. For example, the rear of the vehicle 402 may not be within a field of view of the LIDAR device. In another example, the rear of the vehicle 402 may be within the field of view of the LIDAR device the computing device, but the rear of the vehicle 402 may be occluded by another object (e.g., another vehicle not shown) such that at least a portion (shown in dashed lines in FIG. 4C) of the rear of the vehicle 402 might not appear in the 3D point cloud captured by the LIDAR device and depicted in FIG. 4C. In these examples, the computing device may not directly identify the reference point 404, and may rely on a projection of the reference point from the 3D point cloud of FIG. 4B to the 3D point cloud of FIG. 4C.

The dashed lines in FIG. 4C representing the rear of the vehicle 402 as shown in FIG. 4C indicate that the rear is not directly "visible" to the LIDAR device and is constructed by the computing device via projection based on the transformation. As described above, the transformation is based on matching the portion that is common between the second 3D point cloud of FIG. 4B and the third 3D point cloud of FIG. 4C. In this manner, the computing device may project the reference point 404 from the view of FIG. 4B to the view of FIG. 4C so as to trace the reference point 404.

In an example, multiple reference points on the vehicle 402 may be traced. For instance various corners of the vehicle 402 may be designated as reference points and traced in consecutively captured 3D point clouds. In this example, the computing device may be configured to accurately estimate a shape of the vehicle 402 based on tracing such reference points. Accurate estimation of geometric shape of an identified object may facilitate obtaining more precise estimate of the vehicle dynamics (e.g., by providing for a more accurate estimate of a pose of the vehicle 402, and for more accurate determination of the transformation based on common portions of the vehicle 402 depicted in consecutively captured point clouds).

Referring back to FIG. 3, at block 314, the method 300 includes determining one or more motion characteristics of the object based on the projection of the reference point, the given time period, and the one or more motion characteristics of the vehicle. Based on tracing the reference point, the computing device may estimate a change in location and pose of the vehicle 402. The computing device also has access to the amount of time that elapsed between capturing a 3D point cloud and capturing a consecutive 3D point cloud. For example, the period of time may be based on the capturing frequency of the LIDAR device (e.g., 10 Hz frequency indicating that a 3D point cloud is captured every 0.1 seconds). As mentioned above, the computing device also has access to characteristics (speed, acceleration, orientation, location, etc.) of the vehicle that the computing device is configured to control. Thus, the computing device may be configured to determine motion characteristics of the vehicle 402 (whether the vehicle 402 is moving or parked/stationary, speed, acceleration, etc.) based on estimating the change in location and pose of the vehicle 402 in a given period of time (via tracing the reference point 404) taking into consideration the motion characteristics of the vehicle controlled by the computing device.

The computing device may be configured to perform the method 300 for each identified object or vehicle on the road of travel so as to determine motion characteristics of the vehicles on the road that may affect navigation decisions for the vehicle controlled by the computing device. The computing device of the vehicle may be configured to determine a control strategy or make navigation decisions based on determining the motion characteristics of nearby vehicles on the road such as the vehicle 402. In examples, the computing device may be configured to provide instructions to control the vehicle based on the determined control strategy and navigation decision. For instance, the computing device may be configured to adjust translational velocity, or rotational velocity, or both, of the vehicle controlled by the computing device to navigate the road of travel and avoid collision with identified obstacles/vehicles.

As an example, the computing device may have determined based on tracing the reference point 404 that the vehicle 402 is slowing down and shifting lanes to the lane of travel of the vehicle controlled by the computing device (e.g., the vehicle 402 is shifting lanes and become in front of the vehicle controlled by the computing device). As a result of such determination, the computing device may be configured to reduce speed of the vehicle controlled by the computing device, cause the vehicle to change lanes, or perform any other actions to navigate the road safely.

These control actions and driving situations are for illustration only. Other actions and situations are possible as well.

Figure 5:
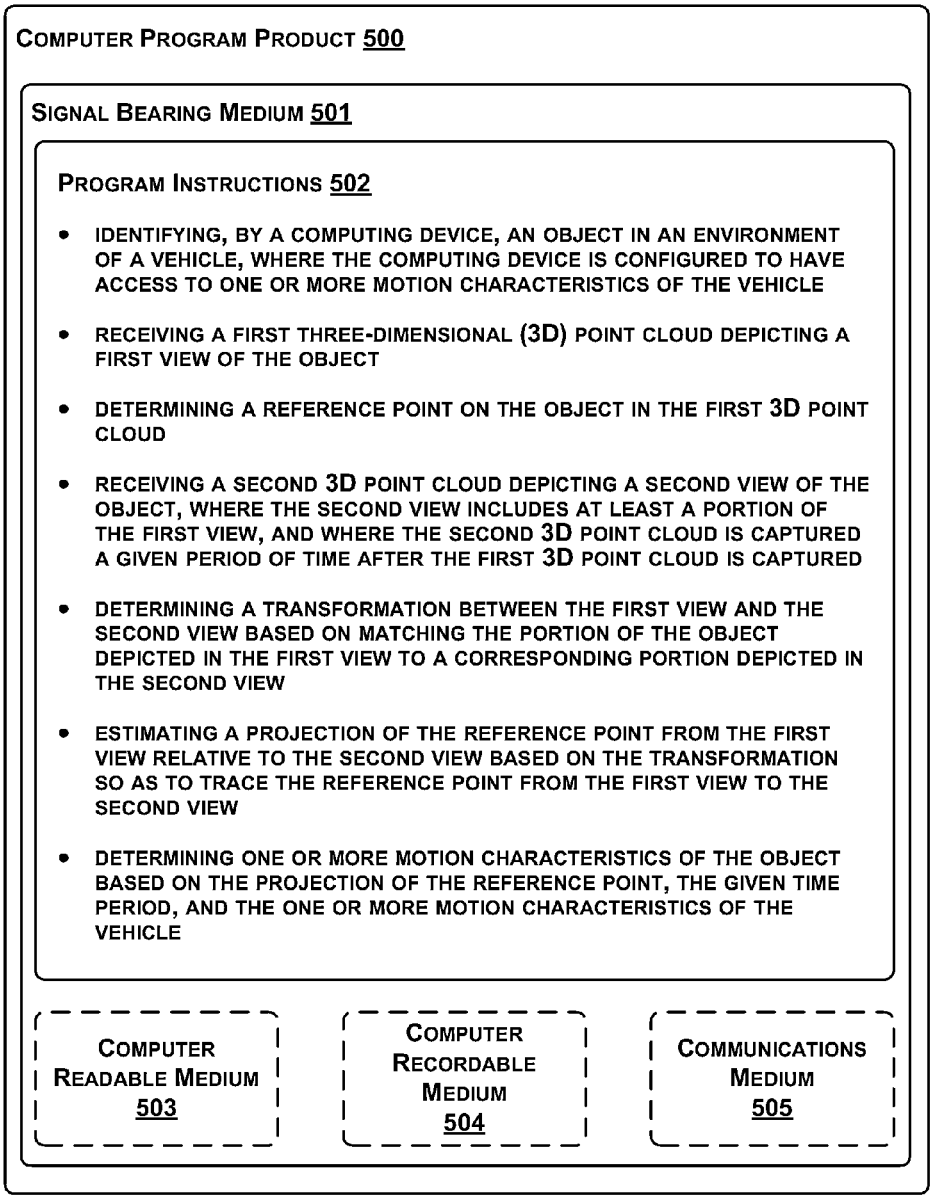
FIG. 5 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors may provide functionality or portions of the functionality described above with respect to FIGS. 1-4C. Thus, for example, referring to the embodiments shown in FIG. 3, one or more features of blocks 302-314 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4C may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   identifying, by a computing device, an object in an environment of a vehicle, wherein the computing device is configured to have access to one or more motion characteristics of the vehicle;
   receiving a first three-dimensional (3D) point cloud depicting a first view of the object;
   determining a reference point on the object in the first 3D point cloud;
   receiving a second 3D point cloud depicting a second view of the object, wherein the second view includes at least a portion of the first view, and wherein the second 3D point cloud is captured a given period of time after the first 3D point cloud is captured;
   determining a transformation between the first view and the second view based on matching the portion of the object depicted in the first view to a corresponding portion depicted in the second view;
   estimating a projection of the reference point from the first view relative to the second view based on the transformation so as to trace the reference point from the first view to the second view; and
   determining one or more motion characteristics of the object based on the projection of the reference point, the given time period, and the one or more motion characteristics of the vehicle.

2. The method of claim 1, wherein the motion characteristics of the vehicle include a speed and a direction of motion of the vehicle, and wherein the motion characteristics of the object include whether the object is moving or stationary, a respective speed, and a respective direction of motion of the object.

3. The method of claim 1, wherein receiving the second 3D point cloud comprises:
   receiving the second 3D point cloud depicting the second view of the object as the vehicle moves relative to the object.

4. The method of claim 1, wherein the reference point on the object is occluded by another object in the second 3D point cloud.

5. The method of claim 1, further comprising:
   identifying multiple reference points on the object;
   tracing the multiple reference points from the first view to the second view; and
   determining one or more geometric characteristics of the object based on tracing the multiple points, wherein determining the one or more motion characteristics of the object is further based on the one or more geometric characteristics of the object.

6. The method of claim 5, further comprising:
   estimating a shape of the object based on tracing the multiple reference points.

7. The method of claim 1, wherein determining the one or more motion characteristics of the object comprises determining the one or more motion characteristics in real-time.

8. The method of claim 1, wherein the computing device is configured to control a vehicle in an autonomous operation mode.

9. The method of claim 1, further comprising:
   providing, by the computing device, instructions to control the vehicle based on determining the one or more motion characteristics of the object, wherein providing the instructions comprises determining a driving decision for the vehicle.

10. A non-transitory computer readable medium having stored thereon instructions that, when executed by a computing device, cause the computing device to perform functions comprising:
    identifying an object in an environment of a vehicle, wherein the computing device is configured to have access to one or more motion characteristics of the vehicle;
    receiving a first three-dimensional (3D) point cloud depicting a first view of the object;
    determining a reference point on the object in the first 3D point cloud;
    receiving a second 3D point cloud depicting a second view of the object, wherein the second view includes at least a portion of the first view, and wherein the second 3D point cloud is captured a given period of time after the first 3D point cloud is captured;
    determining a transformation between the first view and the second view based on matching the portion of the object depicted in the first view to a corresponding portion depicted in the second view;
    estimating a projection of the reference point from the first view relative to the second view based on the transformation so as to trace the reference point from the first view to the second view; and
    determining one or more motion characteristics of the object based on the projection of the reference point, the given time period, and the one or more motion characteristics of the vehicle.

11. The non-transitory computer readable medium of claim 10, wherein the motion characteristics of the vehicle include a speed and a direction of motion of the vehicle, and wherein the motion characteristics of the object include whether the object is moving or stationary, a respective speed, and a respective direction of motion of the object.

12. The non-transitory computer readable medium of claim 10, wherein receiving the second 3D point cloud comprises:
    receiving the second 3D point cloud depicting the second view of the object as the vehicle moves relative to the object.

13. The non-transitory computer readable medium of claim 10, wherein the reference point on the object is occluded by another object in the second 3D point cloud.

14. The non-transitory computer readable medium of claim 10, wherein the functions further comprise:
    identifying multiple reference points on the object;

tracing the multiple reference points from the first view to the second view; and determining one or more geometric characteristics of the object based on tracing the multiple points, wherein determining the one or more motion characteristics of the object is further based on the one or more geometric characteristics of the object.

15. The non-transitory computer readable medium of claim 14, further comprising:

estimating a shape of the object based on tracing the multiple reference points.

16. The non-transitory computer readable medium of claim 10, wherein the functions further comprise:

providing instructions to control the vehicle in an autonomous operation mode based on determining the one or more motion characteristics of the object, wherein the function of providing the instructions comprises determining a driving decision for the vehicle.

17. The non-transitory computer readable medium of claim 16, wherein the function of determining the one or more motion characteristics of the object comprises determining the one or more motion characteristics in real-time.

18. A system, comprising:

at least one processor; and data storage comprising instructions that, when executed by the at least one processor, cause the system to perform functions comprising:

identifying an object in an environment of a vehicle, wherein the at least one processor is configured to have access to one or more motion characteristics of the vehicle;

receiving a first three-dimensional (3D) point cloud depicting a first view of the object;

determining a reference point on the object in the first 3D point cloud;

receiving a second 3D point cloud depicting a second view of the object, wherein the second view includes at least a portion of the first view, and wherein the second 3D point cloud is captured a given period of time after the first 3D point cloud is captured;

determining a transformation between the first view and the second view based on matching the portion of the object depicted in the first view to a corresponding portion depicted in the second view;

estimating a projection of the reference point from the first view relative to the second view based on the transformation so as to trace the reference point from the first view to the second view; and determining one or more motion characteristics of the object based on the projection of the reference point, the given time period, and the one or more motion characteristics of the vehicle.

19. The system of claim 18, wherein the functions further comprise:

identifying multiple reference points on the object;

tracing the multiple reference points from the first view to the second view; and determining one or more geometric characteristics of the object based on tracing the multiple points, wherein determining the one or more motion characteristics of the object is further based on the one or more geometric characteristics of the object.

20. The system of claim 19, wherein the functions further comprise:

estimating a shape of the object based on tracing the multiple reference points, wherein determining the one or more motion characteristics of the object is further based on the estimated shape of the object.

\* \* \* \* \*